(12) United States Patent
Kan et al.

(10) Patent No.: US 6,931,047 B2
(45) Date of Patent: Aug. 16, 2005

(54) LASER LIGHT SOURCE

(75) Inventors: Hirofumi Kan, Hamamatsu (JP); Akihiro Sone, Hamamatsu (JP); Hiroshi Sakai, Hamamatsu (JP); Takunori Taira, Okazaki (JP); Nicolaie Pavel, Hamamatsu (JP); Voicu Lupei, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 269 days.

(21) Appl. No.: 10/327,614

(22) Filed: Dec. 24, 2002

(65) Prior Publication Data

US 2003/0138005 A1 Jul. 24, 2003

(30) Foreign Application Priority Data

Dec. 25, 2001  (JP) .................................... P2001-392330

(51) Int. Cl.[7] ............................................... H01S 3/00
(52) U.S. Cl. ........................................... 372/69; 372/11
(58) Field of Search ..................................... 372/64, 69

(56) References Cited

U.S. PATENT DOCUMENTS

| | | | | |
|---|---|---|---|---|
| 5,488,620 A | * | 1/1996 | Minden | 372/18 |
| 5,991,315 A | * | 11/1999 | Injeyan et al. | 372/11 |
| 6,608,854 B1 | * | 8/2003 | Watanabe | 372/96 |

OTHER PUBLICATIONS

Khurgin, Jacob B., et al., "Cost-effective low timing jitter passively Q-switched diode-pumped solid-state laser with composite pumping pulses", Applied Optics, vol. 41, No. 6, pp. 1095–1097, Feb. 20, 2002.

Huang, Sheng-Lung, et al., "Timing Jitter Reduction of a Passively Q-Switched Laser", Japanese Journal of Applied Physics, vol. 38, Part 2, No. 3A, pp. L239–L241, Mar. 1, 1999.

* cited by examiner

*Primary Examiner*—James Vannucci
(74) *Attorney, Agent, or Firm*—Morgan Lewis & Bockius LLP

(57) ABSTRACT

In the first period from pumping start time T1 to time T2 in a laser light source 1, the power of pumping light L1 outputted from a pumping light source 41 so as to irradiate a laser medium 21 is at value P1 whereas the power of light L2 incident on a saturable absorber 30 after being emitted from the laser medium 21 is at an absorption saturation threshold or lower, which causes a resonator 10 to lower its Q-value, thereby suppressing the laser oscillation. Immediately before time T2, the power of light L2 is slightly lower than the absorption saturation threshold. In the second period subsequent to the first period, the power of light L2 is at value P2 greater than the above-mentioned value P1, whereas the power of light L2 exceeds the absorption saturation threshold, which causes the resonator 10 to increase its Q-value, whereby a mirror 12 outputs pulse laser light L3 to the outside.

4 Claims, 6 Drawing Sheets

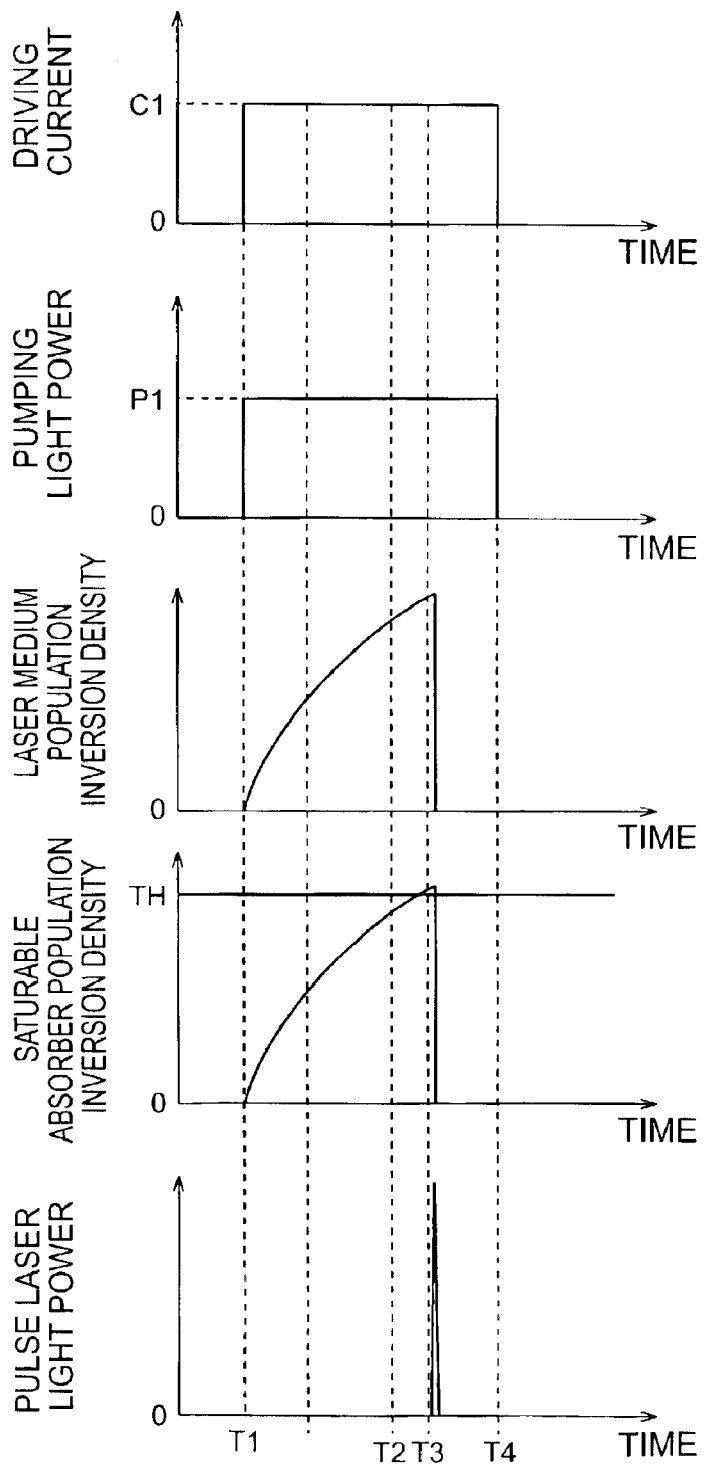

LASER LIGHT SOURCE

BACKGROUND OF THE INVENTION

1. Field of the Invention

The present invention relates to a laser light source for outputting laser light with a high power and a short pulse by using the Q-switching technology.

2. Related Background Art

Laser light sources have been under study and development for attaining higher power, shorter pulse, and shorter wavelength in output light. In particular, attention has been directed toward laser light sources using the Q-switching technology. As a configuration having not only a laser medium but also a Q-switching device within a resonator, the Q-switching technology regulates the laser oscillation by changing the Q-value of resonator with the Q-switching device, thereby causing the laser light outputted therefrom to have a shorter pulse and a higher power.

Various techniques have been known as the Q-switching technology. Among them, the passive Q-switching technique using a saturable absorber as a Q-switching device is preferable in that its laser light source has a configuration simpler and smaller than that in other Q-switching techniques. The saturable absorber exhibits a smaller absorption as the incident light power is higher, and absorbs the incident light when the incident light power is not higher than the absorption saturation threshold, but saturates its absorption and becomes transparent when the incident light power exceeds the absorption saturation threshold. By utilizing such a property, the saturable absorber is used as a Q-switching device.

Namely, a laser light source using a saturable absorber as a Q-switching device operates as follows. At the time when the pumping of a laser medium is started, the laser medium has a small population inversion, whereby the light incident on the saturable absorber after being emitted from the laser medium has a low power. Therefore, at the time when the pumping of the laser medium is started, the saturable absorber exhibits a large absorption and is opaque, whereby the Q-value of resonator is so small that no laser oscillation occurs. Even in a period where the Q-value of resonator is so small that no laser oscillation occurs, the laser medium is continuously pumped, so that the population inversion of the laser medium gradually increases, whereby the light incident on the saturable absorber after being emitted from the laser medium gradually enhances its power. Then, when the power of light incident on the saturable absorber after being emitted from the laser medium exceeds the absorption saturation threshold, the saturable absorber drastically decreases its absorption (i.e., becomes transparent), whereby the resonator enhances its Q-value, so that stimulated emission drastically advances in the laser medium. As a result, a laser oscillation occurs. Thus, pulsed laser light having a high power and a short pulse is outputted from the resonator.

On the other hand, various laser media have been known, whereas various pumping means have been known as those pumping the laser media. For example, Nd:YAG crystal is used as a laser medium, whereas a semiconductor laser light source is used as pumping means for pumping the laser medium upon irradiation with pumping light. In this case, Nd:YAG crystal acting as a laser medium is irradiated with the pumping light outputted from the semiconductor laser light source, so that Nd ions contained in this laser medium are pumped to an upper level, which generates a population inversion. The operation of passive Q-switching is as mentioned above.

Semiconductor laser pumping solid-state laser light sources using such a passive Q-switching technique are favorable in that their configuration is simple and smaller in size. Such a laser light source can be made smaller as a whole since its resonator length may be shorter, and is suitable for outputting pulse laser light having a short pulse.

SUMMARY OF THE INVENTION

However, the above-mentioned conventional laser light sources using the passive Q-switching technique is problematic in that their operations at the time of starting the pumping and thereafter become unstable unless the condition under which the pumping means pumps the laser medium is stable. Namely, if the condition under which the laser medium is pumped by the pumping means is unstable, the rate at which the population inversion of the laser medium increases becomes unstable in the period in which the Q-value of the resonator is so low that no laser oscillation occurs. Also, the span of time from the pumping start time to the pulse laser oscillation time becomes unstable. Namely, pulse laser light is hard to output at a desirable time. Also, intervals between oscillations become unstable when pulse oscillations are repeated.

For eliminating the problems mentioned above, it is an object of the present invention to provide a laser light source which can easily output pulse laser light at a desirable time.

The laser light source in accordance with the present invention comprises (1) a laser medium for emitting light upon pumping; (2) a saturable absorber for receiving the light emitted by the laser medium, the saturable absorber yielding a lower absorption as the incident light power is greater, the saturable absorber being transparent when the incident light power exceeds an absorption saturation threshold; (3) a resonator having the laser medium and the saturable absorber on a resonating optical path, the resonator resonating light emitted from the laser medium and outputting a part of the light from an output end when the saturable absorber is transparent; (4) pumping means for pumping the laser medium in a pulsing manner; and (5) control means for controlling the pumping of the laser medium effected by the pumping means.

Further, the control means in the laser light source in accordance with the present invention (1) causes the pumping means to pump the laser medium in a state with a predetermined value or lower in a first period from time T1 when the pumping means starts pumping the laser medium to time T2, so as to make the light incident on the saturable absorber after being emitted from the laser medium have a power not greater than the absorption saturation value, and suppress a laser oscillation; and (2) causes the pumping means to pump the laser medium in a state exceeding the predetermined value in a second period from the time T2 to time T3, so as to make the light incident on the saturable absorber after being emitted from the laser medium have a power exceeding the absorption saturation threshold and generate a laser oscillation.

In the laser light source in accordance with the present invention, the pumping means controlled by the control means pumps the laser medium in a pulsing manner, whereas light is emitted from the laser medium in response to the pumping and is made incident on the saturable absorber. When the power of light incident on the saturable absorber after being emitted from the laser medium is not higher than the absorption saturation threshold, the saturable absorber absorbs light, so that the Q-value of resonator is low, whereby the laser oscillation is suppressed. When the power of light incident on the saturable absorber after being emitted from the laser medium exceeds the absorption saturation threshold, by contrast, the absorption of light in the saturable absorber is saturated, so that the saturable absorber becomes transparent, which increases the Q-value of resonator, whereby the laser oscillation may occur. This laser oscillation causes the resonator to output pulse laser light from its output end to the outside.

In particular, the laser light source in accordance with the present invention operates as follows under the control of the control means. Namely, in the first period from time T1 when the pumping means starts pumping the laser medium to time T2, the state of pumping of the laser medium effected by the pumping means is not higher than a predetermined value, whereas the power of light incident on the saturable absorber after being emitted from the laser medium is not higher than the absorption saturation threshold, whereby the laser oscillation is suppressed. In the second period from time T2 to time T3 subsequent to the first period, the state of pumping of the laser medium effected by the pumping means exceeds the predetermined value, whereas the power of light incident on the saturable absorber after being emitted from the laser medium exceeds the absorption saturation value, whereby the laser oscillation is started.

Therefore, pulse laser light is outputted immediately after time T2 when the pumping of the laser medium effected by the pumping means becomes strong. As a consequence, even if the condition under which the pumping means pumps the laser medium is unstable, the control means can regulate the pulse laser light output timing by simply adjusting the respective timings for the pumping start time T1 and time T2. Hence, it is easy for the laser light source in accordance with the present invention to output pulse laser light at a desirable time, and make oscillation intervals constant when repeating pulse oscillations.

BRIEF DESCRIPTION OF THE DRAWING

FIGS. 3A, 3B, 3C, 3D and 3E are the Charts for explaining operations of the laser light source in accordance with the first comparative example.

DESCRIPTION OF THE PREFERRED EMBODIMENT

In the following, embodiments of the present invention will be explained in detail with reference to the accompanying drawings. In the explanation of the drawings, constituents identical to each other will be referred to with numerals identical to each other without repeating their overlapping descriptions.

(First Embodiment)

To begin with, a first embodiment of the laser light source in accordance with the present invention will be explained.

Figure 1:
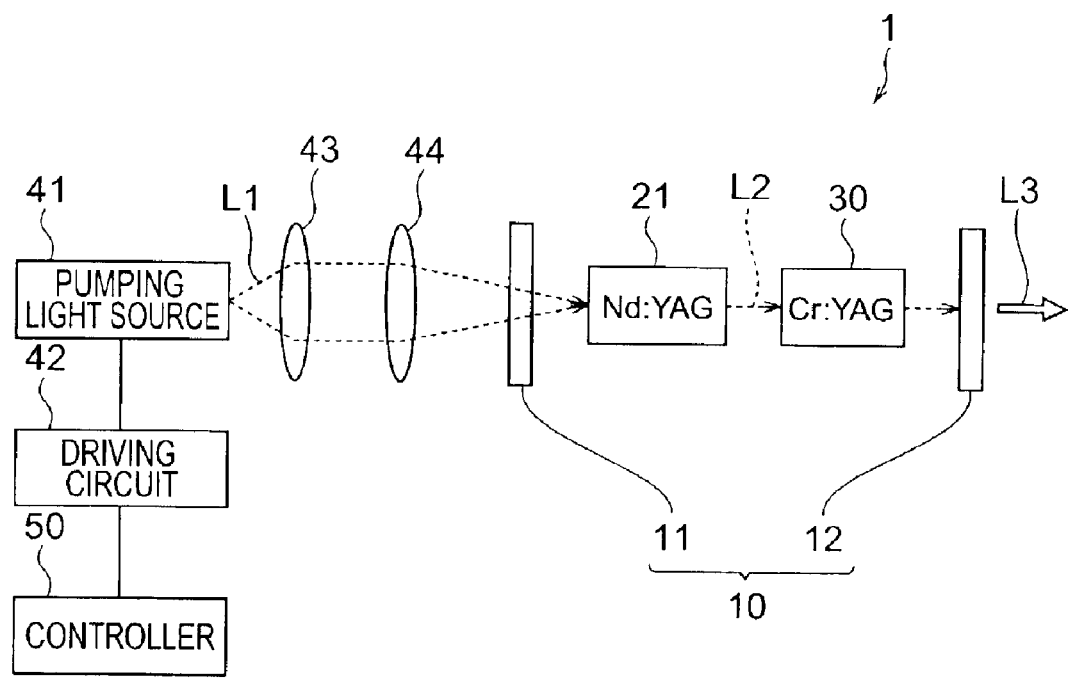
FIG. 1 is a diagram of the laser light source 1 in accordance with the first embodiment.

FIG. 1 is a diagram of the laser light source 1 in accordance with the first embodiment. The laser light source 1 shown in this drawing comprises a resonator 10, a laser medium 21, a saturable absorber 30, a pumping light source 41, and a controller 50. The laser light source 1 comprises the pumping light source 41, a driving circuit 42, and lenses 43, 44 as pumping means for pumping the laser medium 21.

The resonator 10 has mirrors 11 and 12 opposing each other. One mirror 11 transmits therethrough pumping light L1 outputted from the pumping light source 41 but reflects at a high reflectance light L2 emitted from the pumped laser medium 21. The other mirror 12 transmits therethrough a part of the light L2 having arrived after being emitted from the pumped laser medium 21 and reflects the remainder. Light L3 transmitted through the mirror 12 to the outside becomes laser oscillation light to be outputted from the laser light source 1.

Each of the laser medium 21 and saturable absorber 30 is disposed on a resonating optical path of the resonator 10. The laser medium 21 is positioned between the mirror 11 and the saturable absorber 30. When the pumping light LI outputted from the pumping light source 41 is incident on the laser medium 21, the latter is pumped to an upper level, so as to generate a population inversion, thereby releasing the light L2 upon transition from the upper to lower level. The saturable absorber 30 functions as a Q-switching device, and receives the light L2 emitted from the laser medium 21, whereas its absorption decreases as the incident light power is greater, so that it absorbs the incident light when the incident light power is not greater than its absorption saturation threshold, but becomes transparent when the incident light power exceeds the absorption saturation threshold. The end face of laser medium 21 opposing the saturable absorber 30 is provided with a coating of a dielectric multilayer film which reflects at a high reflectance the pumping light L1 outputted from the pumping light source 41.

The pumping light source 41 is driven with a driving current supplied from the driving circuit 42, so as to output the pumping light L1 having a wavelength adapted to pump the laser medium 21. The pumping light L1 outputted from the pumping light source 41 irradiates the laser medium 21 by way of the lenses 43, 44 and the mirror 11. By controlling the driving circuit 42, the controller 50 regulates the pumping of the laser medium 21 upon irradiation with the pumping light L1 outputted from the pumping light source 41. Under the control of the controller 50, the pumping light source 41 outputs pulsed pumping light L1, thereby pumping the laser medium 21 in a pulsing manner.

For example, the laser medium 21 is Nd:YAG crystal, whereas the saturable absorber 30 is Cr:YAG crystal. In this case, a semiconductor laser light source outputting the pumping light L1 having a wavelength near 810 nm adapted to pump Nd ions contained in the laser medium 21 to an upper level is used as the pumping light source 41. When the pumping light L1 outputted from the pumping light source 41 is incident on the laser medium 21, Nd ions contained in the laser medium 21 are pumped to the upper level. When the light L2 emitted from the laser medium 21 is incident on the saturable absorber 30, Cr ions contained in the saturable absorber 30 are pumped to an upper level. The wavelength of light L2, L3 outputted from the laser medium 21 is 1064 nm.

In the laser light source 1, the pumping light L1 outputted from the pumping light source 41 is collected by the lenses 43 and 44, and is transmitted through the mirror 11, so as to be made incident on the laser medium 21. The pumping light L1 incident on the laser medium 21 is transmitted through the laser medium 21, and then is reflected at the end face opposite from the entrance side, so as to be transmitted through the laser medium 21 again. While the pumping light L1 is transmitted through the laser medium 21, the latter is pumped and releases the light L2 upon transition from the pumped upper level to the lower level. The light L2 emitted from the laser medium 21 is made incident on the saturable absorber 30. When the power of light L2 incident on the saturable absorber 30 is not higher than the absorption saturation threshold, the saturable absorber 30 absorbs the light L2, whereby the Q-value of the resonator 10 is so small that the laser oscillation is suppressed. When the power of light L2 incident on the saturable absorber 30 exceeds the absorption saturation threshold, by contrast, the absorption of light L2 in the saturable absorber 30 is saturated, so that the saturable absorber 30 becomes transparent, whereby the Q-value of the resonator 10 is so large that the laser oscillation may occur. Then, due to this laser oscillation, the laser light L3 is outputted from the mirror 12, which is the output end, to the outside.

Figure 2A:
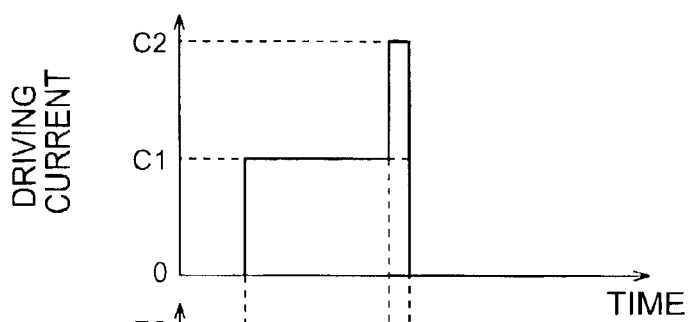
FIGS. 2A, 2B, 2C, 2D and 2E are the Charts for explaining operations of the laser light source 1 in accordance with the first embodiment.
Figure 2B:
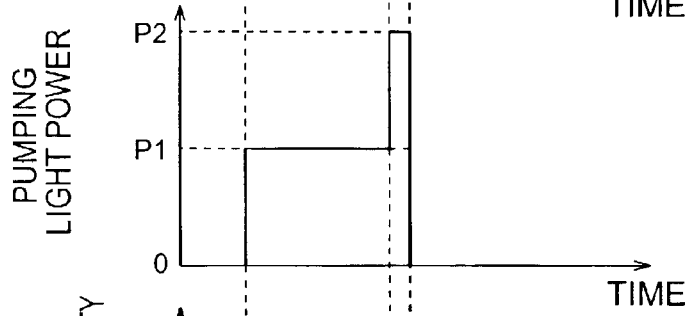
Figure 2C:
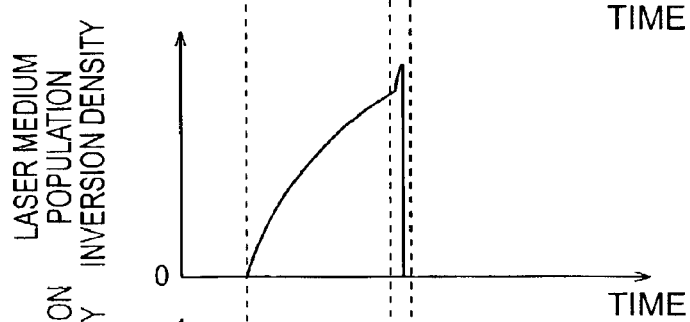
Figure 2D:
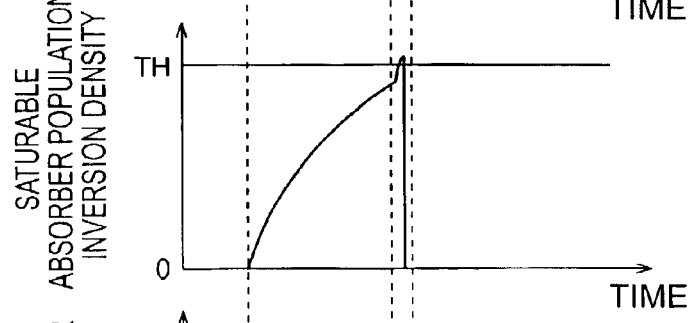
Figure 2E:
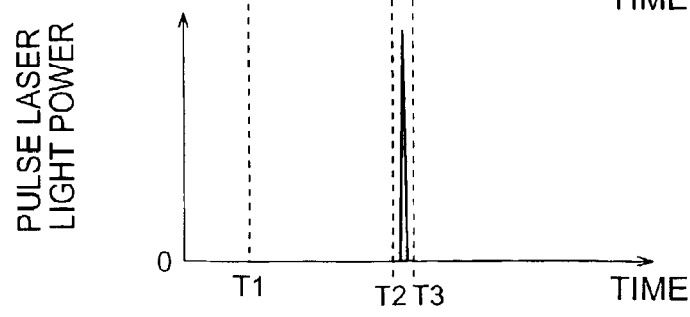

Operations of the laser light source 1 in accordance with the first embodiment under the control of the controller 50 will now be explained. FIGS. 2A to 2E are charts for explaining operations of the laser light source 1 in accordance with the first embodiment. FIG. 2A shows the change in the value of driving current supplied from the driving circuit 42 to the pumping light source 41 with time. FIG. 2B shows the change in the power of pumping light L1 outputted from the pumping light source 41 with time. FIG. 2C shows the change in population inversion in the laser medium 21 with time. FIG. 2D shows the change in population inversion in the saturable absorber 30 with time. FIG. 2E shows the change in the power of laser light L3 transmitted through the mirror 12 so as to be outputted to the outside of the resonator 10.

As shown in FIG. 2A, the driving current supplied from the driving circuit 42 to the pumping light source 41 is at value C1 in the first period from the pumping start time T1 to time T2, and at value C2 in the second period from time T2 to time T3. Along with such a change in the value of driving current with time, the power of pumping light L1 outputted from the pumping light source 41 attains value P1 in the first period and value P2 in the second period as shown in FIG. 2B. Here, C1<C2, and P1<P2. Preferably, value P2 is at least two times value P1.

In the first period, as shown in FIG. 2C, the population inversion in the laser medium 21 gradually increases, and the power of light L2 emitted from the laser medium 21 gradually increases, whereby the population inversion in the saturable absorber 30 gradually becomes greater as shown in FIG. 2D. In the first period, however, the power of light L2 incident on the saturable absorber 30 is not higher than the absorption saturation threshold, whereby the saturable absorber 30 has such a large absorption that it is opaque, thus causing the resonator 10 to exhibit a lower Q-value. Therefore, in the first period, the laser oscillation is suppressed as shown in FIG. 2E.

As shown in FIG. 2B, the power of pumping light L1 outputted from the pumping light source 41 drastically increases to value P2 at time T2 where the transition from the first to second period occurs, whereas value P2 is maintained in the second period. As a result, at time T2 where the second period begins, the population inversion in the laser medium 21 begins to increase drastically as shown in FIG. 2C, so that the power of light L2 emitted from the laser medium 21 starts increasing drastically as well, whereby the population inversion in the saturable absorber 30 begins to increase drastically as shown in FIG. 2D. Then, in a short period of time after time T2, the power of light L2 incident on the saturable absorber 30 exceeds the absorption saturation threshold, so that the population inversion in the saturable absorber 30 exceeds threshold TH as shown in FIG. 2D, whereby the saturable absorber 30 becomes transparent, thus causing the resonator 10 to attain a greater Q-value, which starts the laser oscillation as shown in FIG. 2E.

When the laser oscillation is started, stimulated emission drastically occurs in the laser medium 21, so that its population inversion becomes substantially zero, along which the population inversion of the saturable absorber 30 becomes substantially zero, whereby the resonator 10 lowers its Q-value rapidly. Therefore, the laser oscillation is completed in a very short period of time. As such, in the laser light source 1, the pulse laser light L3 having a high power and a short pulse is outputted from the mirror 12 to the outside.

The time required for each of the first and second periods is appropriately set according to respective fluorescence lives of the laser medium 21 and saturable absorber 30. For example, when the laser medium 21 is Nd:YAG crystal whereas the saturable absorber 30 is Cr:YAG crystal, it is preferred that respective times required for the first and second periods be 100 to 500 $\mu$s and 1 to 10 $\mu$s.

In the first period from the pumping start time T1 to T2 in the laser light source 1 in accordance with this embodiment, as in the foregoing, the power of pumping light L1 outputted from the pumping light source 41 so as to irradiate the laser medium 21 is at value P1, whereas the power of light L2 incident on the saturable absorber 30 after being emitted from the laser medium 21 is not higher than the absorption saturation threshold, whereby the resonator 10 exhibits a low Q-value, which suppresses the laser oscillation. Immediately before time T2, the power of light L2 incident on the saturable absorber 30 is slightly lower than the absorption saturation threshold. In the second period subsequent to the first period, the power of pumping light L1 outputted from the pumping light source 41 so as to irradiate the laser medium 21 is at value P2 greater than the above-mentioned value P1, whereas the power of light L2 incident on the saturable absorber 30 after being emitted from the laser medium 21 exceeds the absorption saturation threshold, whereby the Q-value of the resonator 10 becomes so large that the pulse laser light L3 having a high power and a short pulse is outputted from the mirror 12 to the outside.

The foregoing operations of the laser light source 1 in accordance with the first embodiment will now be compared with those of respective laser light sources in accordance with first and second comparative examples. FIGS. 3A to 3E are charts for explaining operations of the laser light source in accordance with the first comparative example. FIGS. 4A to 4E are charts for explaining operations of the laser light source in accordance with the second comparative example. Each of the laser light sources in accordance with the first and second comparative examples has substantially the same configuration as that of the laser light source 1 in accordance with the first embodiment. However, each of the laser light sources in accordance with the first and second comparative examples differs from the laser light source 1 in accordance with the first embodiment in terms of the change in the power of pumping light incident on the laser medium after being outputted from the pumping light with time.

Figure 4A:
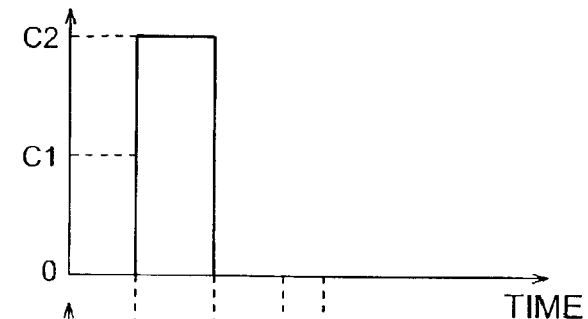
FIGS. 4A, 4B, 4C, 4D and 4E are the Charts for explaining operations of the laser light source in accordance with the second comparative example.
Figure 4B:
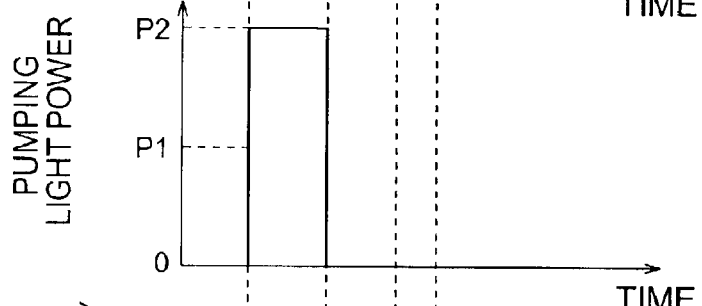
Figure 4C:
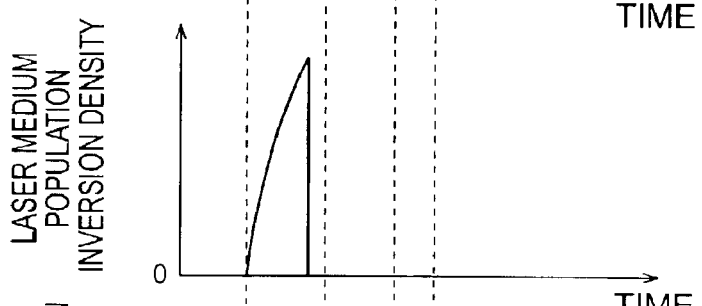
Figure 4D:
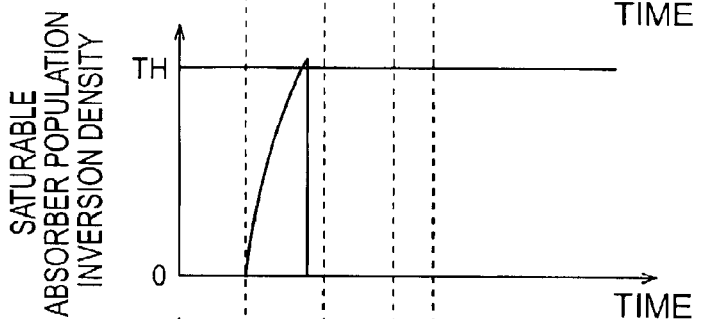
Figure 4E:
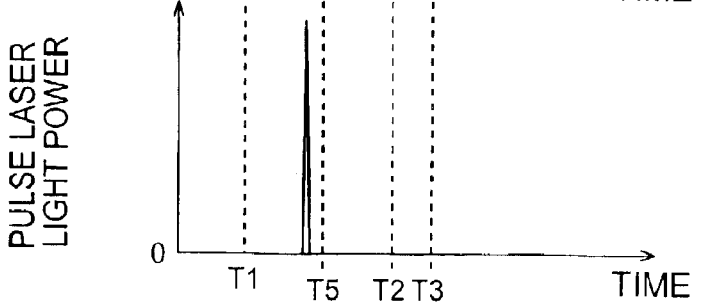

Each of FIGS. 3A and 4A shows the change in the value of driving current supplied from the driving circuit to the pumping light source. Each of FIGS. 3B and 4B shows the change in the power of pumping light outputted from the pumping light source with time. Each of FIGS. 3C and 4C shows the change in population inversion in the laser medium with time. Each of FIGS. 3D and 4D shows the change in population inversion in the saturable absorber with time. Each of FIGS. 3E and 4E shows the change in the power of laser light outputted to the outside of the resonator with time.

After the pumping start time T1 in the first comparative example, as shown in FIGS. 3A and 3B, the driving current supplied from the driving circuit to the pumping light source is constant at value C1 whereas the power of pumping light outputted from the pumping light source is constant at value P1. As shown in FIGS. 4A and 4B, on the other hand, after the pumping start time T1 in the second comparative example, the driving current supplied from the driving circuit to the pumping light source is constant at value C2 whereas the power of pumping light outputted from the pumping light source is constant at value P2. The respective values of C1, C2, P1, and P2 are assumed to be the same as those shown in FIGS. 2A to 2E.

In the period from pumping start time T1 to time T2 in the first comparative example, as shown in FIGS. 3C and 3D, each of the respective population inversions of the laser medium and saturable absorber increases at the same rate as that in the first embodiment. Since the power of pumping light outputted from the pumping light source is kept at value P1 even after time T2, however, the rate at which each of the population inversions of the laser medium and saturable absorber increases is substantially on a par with that before time T2. Therefore, as shown in FIG. 3E, the laser oscillation is not started immediately after time T2 but after time T3.

In the second comparative example, since the power of pumping light outputted from the pumping light source after the pumping start time T1 has a large value of P2, the rate at which each of the population inversions of the laser medium and saturable absorber increases is higher than that in the first embodiment as shown in FIGS. 4C and 4D. Therefore, as shown in FIG. 4E, the laser oscillation is started at time T5 before time T2.

Figure 5A:
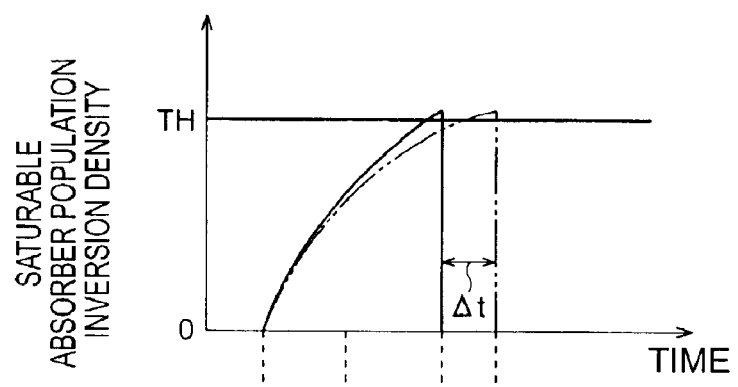
FIGS. 5A and 5B are the Charts for explaining relationships between the rate at which the population inversion of saturable absorber increases and the laser oscillation start time.
Figure 5B:
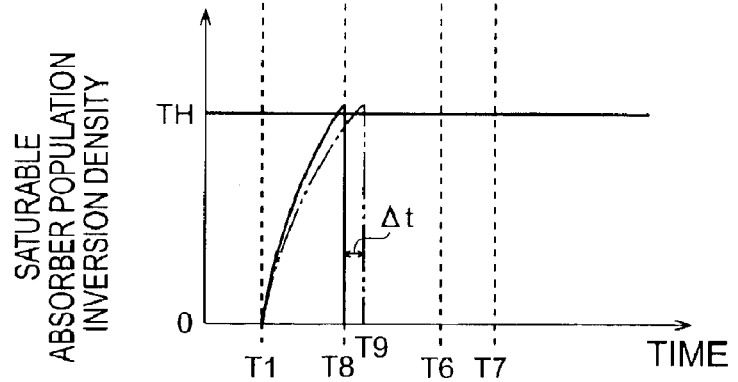

As can be seen when FIGS. 3D and 4D are compared with each other, the rate at which the population inversion of the saturable absorber increases differs between the first and second comparative examples. FIGS. 5A and 5B are charts for explaining relationships between the rate at which the population inversion of saturable absorber increases and the laser oscillation start time. When the rate at which the population inversion of saturable absorber increases is relatively low as in the first comparative example, as shown in FIG. 5A, it takes a relatively long time from the pumping start time T1 to laser oscillation start time T6, while the laser oscillation start time will shift to T7 even if the power of pumping light L1 fluctuates slightly, thus yielding a large fluctuation width Δt in laser oscillation start time. When the rate at which the population inversion increases is relatively high, on the other hand, it takes a relatively short time from the pumping start time T1 to laser oscillation start time T8 as shown in FIG. 5B, while the power fluctuation of pumping light L1 is less influential in the shift of laser oscillation start time, thereby yielding a small fluctuation width Δt in laser oscillation start time.

Thus, for stabilizing the span of time from the pumping start time to the laser oscillation start time, it is preferred that the rate at which the population inversion of saturable absorber increases be higher and, consequently, that the power of pumping light outputted from the pumping light source be higher. In this case, however, the driving current supplied to the pumping light source is so large that the burden on the pumping light source becomes heavier, which shortens the life of the pumping light source. The laser light source 1 in accordance with this embodiment can overcome such problems inherent in each of the laser light sources in accordance with the first and second comparative examples.

Namely, the laser light source 1 in accordance with this embodiment outputs pulse laser light L3 immediately after time T2 at which the power of pumping light L1 outputted from the pumping light source 41 so as to irradiate the laser medium 21 rises from value P1 to value P2. As a consequence, even when the power of pumping light L2 outputted from the pumping light source 41 is unstable, the controller 50 can regulate the output timing of pulse laser light L3 by simply adjusting the respective timings for the pumping start time T1 and time T2. Therefore, the laser light source 1 in accordance with this embodiment can easily output pulse laser light L3 at a desirable time, and can easily attain constant oscillation intervals when repeating pulse oscillations.

In the laser light source 1 in accordance with this embodiment, the driving current supplied to the pumping light source 41 is smaller in the first period but is larger only in the second period that terminates in a short time. Therefore, the burden on the pumping light source 41 is so small that the pumping light source 41 can be used over a long period of time, whereby not only the cost of the employed pumping light source 41 itself but also the maintenance cost required for operations of replacing the pumping light source 41 and the like can be suppressed. Also, since the pumping light source 41 is restrained from raising its temperature, the fluctuation in the wavelength of pumping light L1 is suppressed, whereby the laser medium 21 is pumped efficiently. Also, the period in which each of the laser medium 21 and saturable absorber 30 is in a state with a large population inversion is so short that the temperature rise is suppressed, whereby thermal saturation is reduced, which makes it possible to increase the energy and peak intensity of output laser light L3 per pulse. The laser light source 1 can operate stably due to these points as well. Further, since a cooling mechanism can be simplified, the laser light source 1 can be made smaller in size including this cooling mechanism.

(Second Embodiment)

Figure 6:
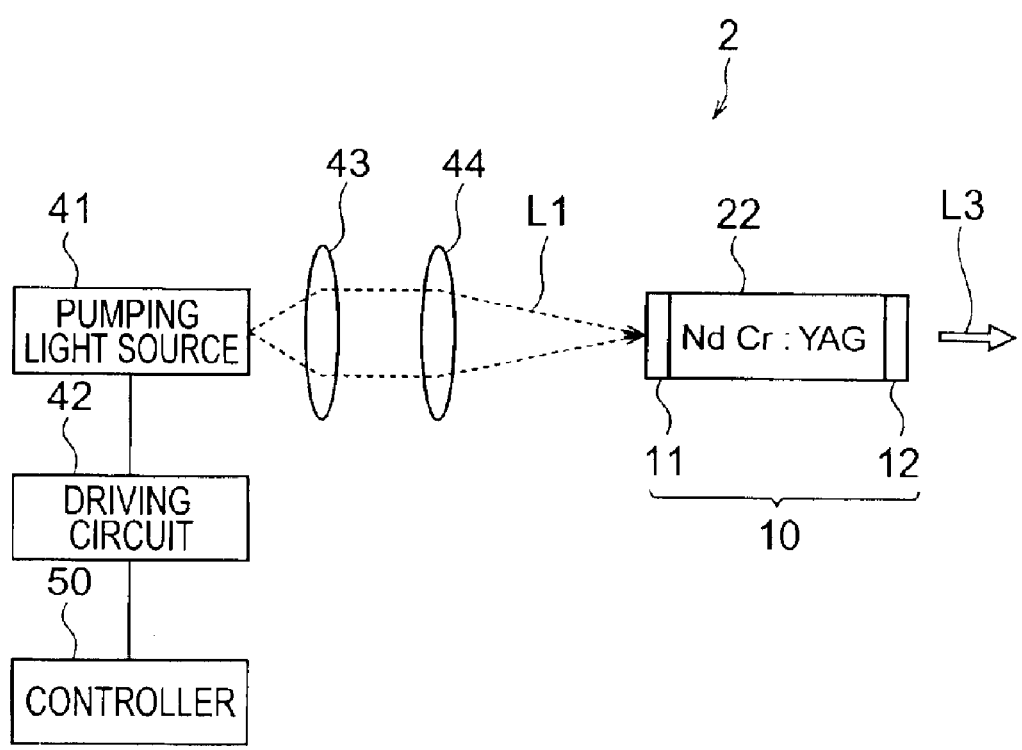
FIG. 6 is a diagram of the laser light source 2 in accordance with the second embodiment.

A second embodiment of the laser light source in accordance with the present invention will now be explained. FIG. 6 is a diagram showing the laser light source 2 in accordance with the second embodiment. The laser light source 2 shown in this drawing comprises a resonator 10, a laser medium 22, a pumping light source 41, and a controller 50. The laser light source 1 comprises the pumping light source 41, a driving circuit 42, and lenses 43, 44 as pumping means for pumping the laser medium 22.

The laser light source 2 in accordance with the second embodiment differs from that in accordance with the first embodiment in that the laser medium 22 also acts as a saturable absorber which is a Q-switching device. As the laser medium 22 also acting as a saturable absorber, NdCr:YAG crystal is preferably used, for example.

Though the mirrors 11 and 12 constituting the resonator 10 may be provided separately from the laser medium 22 as in the first embodiment, they are formed by dielectric multilayer film coatings formed at end faces of the laser medium 22 in the second embodiment. Namely, the mirror 11 is a dielectric multilayer film coating formed at the end face of laser medium 22 on the pumping light source 41 side, which transmits therethrough the pumping light L1 outputted from the pumping light source 41 but reflects at a high reflectance the light emitted from the pumped laser medium 22. The other mirror 12 is a dielectric multilayer film coating formed at the end face of laser medium 22 on the side opposite from the mirror 11, which transmits therethrough a part of the power of light emitted from the pumped laser medium 22 while reflecting the remainder and reflects the pumping light L1 at a high reflectance.

Operations of the laser light source 2 in accordance with the second embodiment will now be explained with reference to FIGS. 2A to 2E. Under the control of the controller 50, the laser light source 2 in accordance with the second embodiment operates in substantially the same manner as that in accordance with the first embodiment. Namely, as shown in FIG. 2A, the driving current supplied from the driving circuit 42 to the pumping light source 41 is at value C1 in the first period from the pumping start time T1 to time T2, and at value C2 in the second period from time T2 to time T3. Along with such a change in the value of driving current with time, the power of pumping light L1 outputted from the pumping light source 41 attains value P1 in the first period and value P2 in the second period as shown in FIG. 2B. Here, C1<C2, and P1<P2. Preferably, value P2 is at least two times value P1.

In the first period, as shown in FIG. 2C, the population inversion in the laser medium 22 gradually increases, so that the power of light emitted from the laser medium 22 gradually increases as Nd ions shift from an upper level to a lower level, whereby the population inversion of Cr ions contained in the laser medium 22 acting as a saturable absorber gradually becomes greater as shown in FIG. 2D. In the first period, however, the power of light occurring upon the transition of Nd ions and irradiating Cr ions is not higher than the absorption saturation threshold, whereby the laser medium 22 acting as a saturable absorber has such a large absorption that it is opaque, thus causing the resonator 10 to exhibit a lower Q-value. Therefore, in the first period, the laser oscillation is suppressed as shown in FIG. 2E.

As shown in FIG. 2B, the power of pumping light L1 outputted from the pumping light source 41 drastically increases to value P2 at time T2 where the transition from the first to second period occurs, whereas value P2 is maintained in the second period. As a result, at time T2 where the second period begins, the population inversion in the laser medium 22 begins to increase drastically as shown in FIG. 2C, so that the power of light emitted from the laser medium. 22 starts increasing drastically, whereby the population inversion of Cr ions in the laser medium 22 acting as a saturable absorber begins to increase drastically as shown in FIG. 2D. Then, in a short period of time after time T2, the power of light occurring and irradiating Cr ions upon the transition of Nd ions exceeds the absorption saturation threshold, so that the population inversion of Cr ions exceeds threshold TH as shown in FIG. 2D, whereby the laser medium 22 acting as the saturable absorber 22 becomes transparent, thus causing the resonator 10 to attain a greater Q-value, which starts the laser oscillation as shown in FIG. 2E.

When the laser oscillation is started, stimulated emission drastically occurs in the laser medium 22, so that the population inversion of Nd ions becomes substantially zero, along which the population inversion of Cr ions in the laser medium 22 acting as a saturable absorber becomes substantially zero, whereby the Q-value of the resonator 10 decreases rapidly. Therefore, the laser oscillation is completed in a very short period of time. As such, in the laser light source 2, the pulse laser light L3 having a high power and a short pulse is outputted from the mirror 12 to the outside.

In the first period from the pumping start time T1 to time T2 in the laser light source 2 in accordance with this embodiment, as in the foregoing, the power of pumping light L1 outputted from the pumping light source 41 so as to irradiate the laser medium 22 is at value P1 while the power of light occurring and irradiating Cr ions upon the transition of Nd ions in the laser medium 22 is not higher than the absorption saturation threshold, so that the resonator 10 exhibits a lower Q-value, thereby suppressing the laser oscillation. Immediately before time T2, the power of light irradiating Cr ions is slightly lower than the absorption saturation threshold. In the second period subsequent to the first period, the power of pumping light L1 outputted from the pumping light source 41 so as to irradiate the laser medium 22 is at value P2 greater than the above-mentioned value P1, so that the power of light occurring and irradiating Cr ions upon the transition of Nd ions in the laser medium 22 exceeds the absorption saturation threshold, so that the resonator 10 increases its Q-value, whereby the pulse laser light L3 having a high power and a short pulse is outputted from the mirror 12 to the outside.

The laser light source 2 in accordance with the second embodiment can achieve not only effects similar to those obtained by the first embodiment, but also the following effects. Namely, since the laser medium 22 performs not only the role of the laser medium itself but also that of a saturable absorber acting as a Q-switching device in this embodiment, the resonator length can be shortened, whereby the laser light source 2 can be made further smaller.

As explained in detail in the foregoing, in the first period from time T1 when the pumping means starts pumping the laser medium to time T2, the state of pumping of the laser medium effected by the pumping means is at a predetermined value or lower, whereas the power of light incident on the saturable absorber after being emitted from the laser medium is not higher than the absorption saturation threshold, whereby the laser oscillation is suppressed. In the subsequent second period from time T2 to time T3, the state of pumping of the laser medium effected by the pumping means is caused to exceed the predetermined value, whereas the power of light incident on the saturable absorber after being emitted from the laser medium exceeds the absorption saturation value, whereby the laser oscillation is started.

As a consequence, pulse laser light is outputted immediately after time T2 when the pumping of the laser medium effected by the pumping means becomes strong. Therefore, even if the condition under which the pumping means pumps the laser medium is unstable, the control means can regulate the pulse laser light output timing by simply adjusting the respective timings for the pumping start time T1 and time T2. Hence, it is easy for the laser light source in accordance with the present invention to output pulse laser light at a desirable time, and make oscillation intervals constant when repeating pulse oscillations.

As stated above, the laser light source comprises a pair of mirrors 11,12; a laser medium 21 arranged between said mirrors 11,12; a saturable absorber 30 arranged between said mirrors 11,12; a pumping light source 41 for pumping the laser medium 21 in a pulsing manner; and a controller 50 that controls the pumping light source 41 as follows: (a) pumping the laser medium 21 at a low power in a first period, and (b) pumping the laser medium 21 at a higher power than in step (a) in a second period that is sequential to the first period. Note that the power in step (b) is at least two times the power in step (a).

What is claimed is:

1. A laser light source comprising:

a laser medium for emitting light upon pumping;

a saturable absorber for receiving said light emitted by said laser medium, said saturable absorber yielding a lower absorption as the incident light power is greater, said saturable absorber being transparent when the incident light power exceeds an absorption saturation threshold;

a resonator having said laser medium and said saturable absorber on a resonating optical path, said resonator resonating light emitted from said laser medium and outputting a part of said light from an output end when said saturable absorber is transparent;

pumping means for pumping said laser medium in a pulsing manner; and control means for controlling the pumping of said laser medium effected by said pumping means;

wherein said control means causes said pumping means to pump said laser medium in a state with a predetermined value or lower in a first period from time T1 when said pumping means starts pumping said laser medium to time T2, so as to make the light incident on said saturable absorber after being emitted from said laser medium have a power not greater than said absorption saturation value and suppress a laser oscillation; and causes said pumping means to pump said laser medium in a state exceeding said predetermined value in a second period from said time T2 to time T3, so as to make the light incident on said saturable absorber after being emitted from said laser medium have a power exceeding said absorption saturation threshold and generate a laser oscillation.

2. A laser light source according to claim 1, comprising:

a pair of mirrors;

said laser medium arranged between said mirrors;

said saturable absorber arranged between said mirrors;

said pumping means comprising a pumping light source for pumping said laser medium in a pulsing manner; and said control means comprising a controller that controls said pumping light source as follows:
 (a) pumping the laser medium at a low point in a first period, and
 (b) pumping the laser medium at a higher power than in step (a) in a second period that is sequential to the first period.

3. A laser light source according to claim 1, wherein said laser medium includes Nd:YAG crystal.

4. A laser light source according to claim 1, wherein said saturable absorber includes Cr:YAG crystal.

* * * * *